June 24, 1930.   J. E. WRIGHT   1,767,032
VEHICLE
Filed Jan. 15, 1927   2 Sheets-Sheet 1
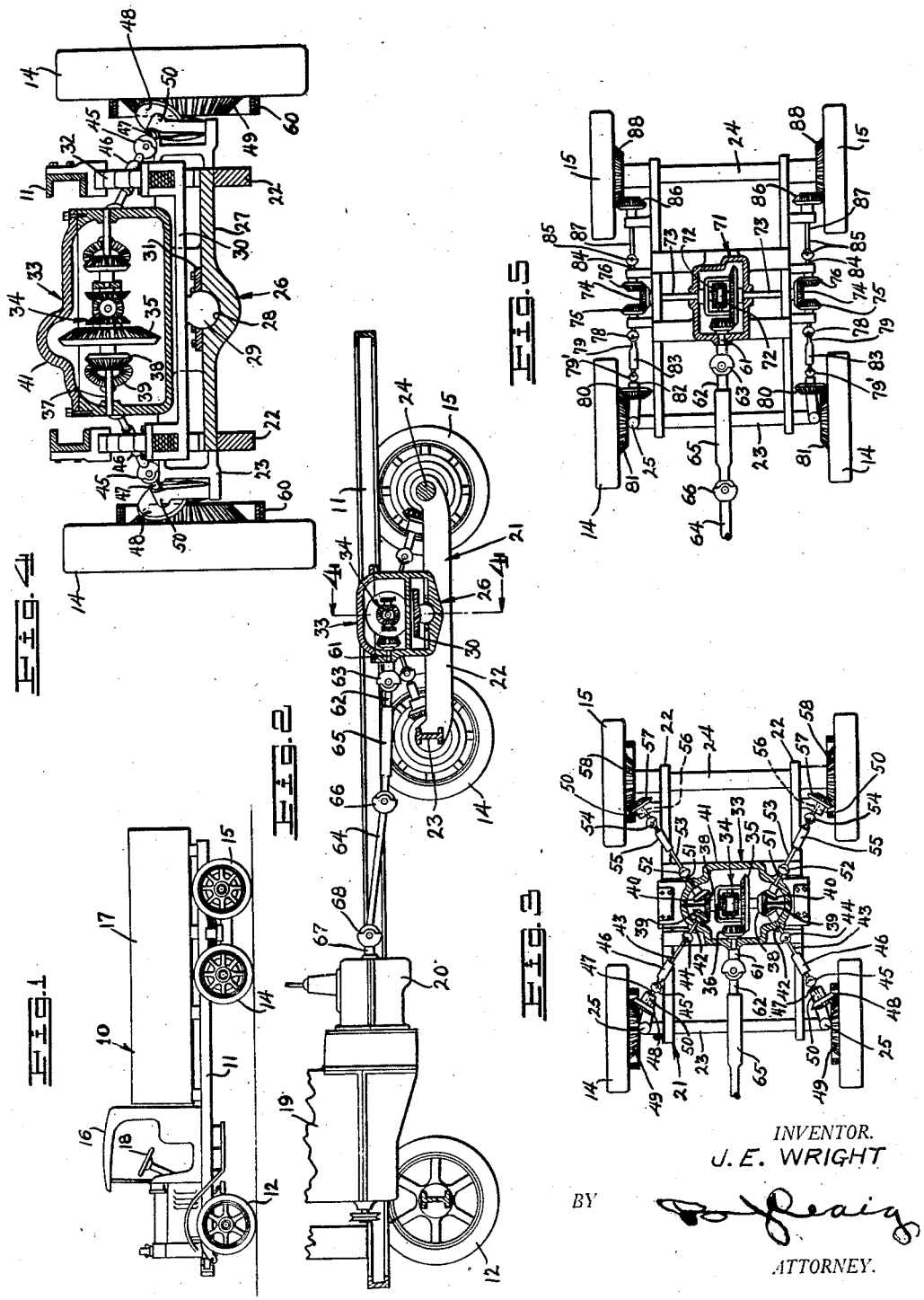
INVENTOR.
J. E. WRIGHT
BY
ATTORNEY.

June 24, 1930.  J. E. WRIGHT  1,767,032
VEHICLE
Filed Jan. 15, 1927  2 Sheets-Sheet 2
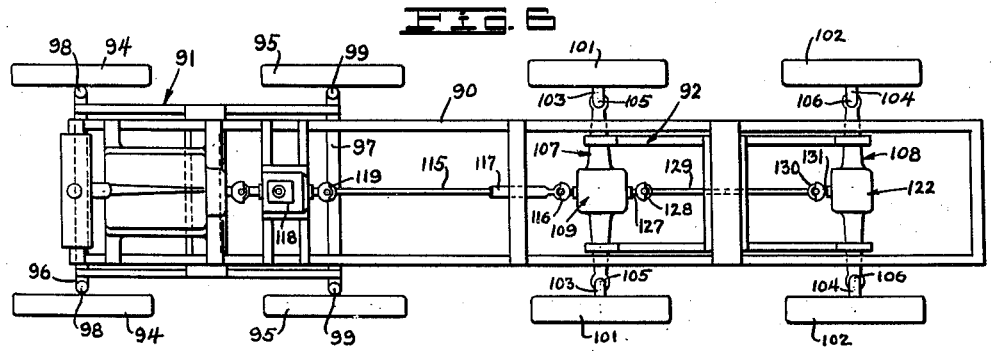
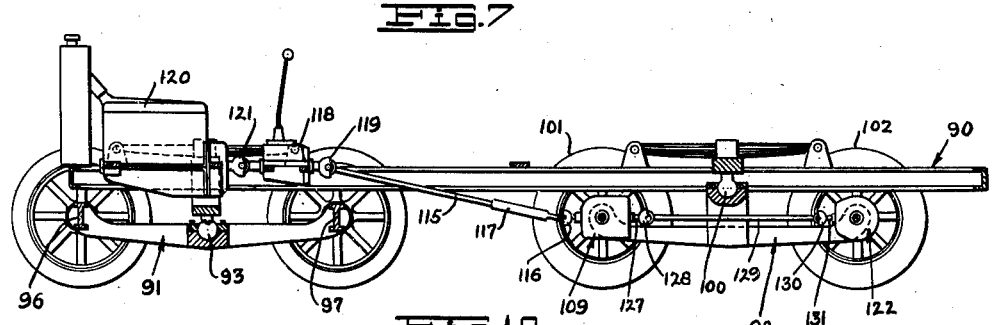
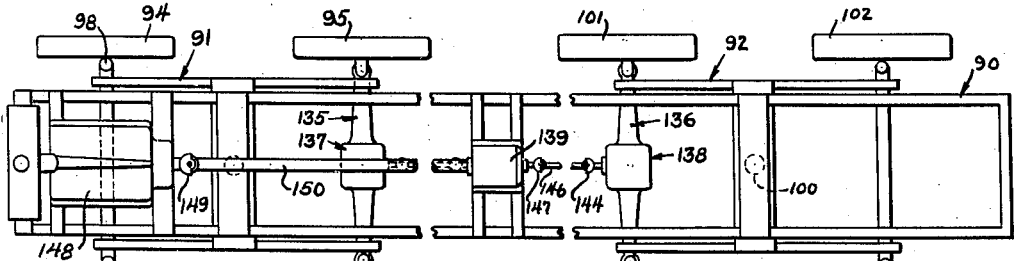
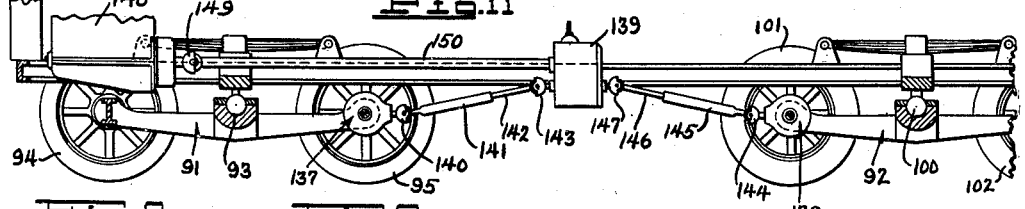
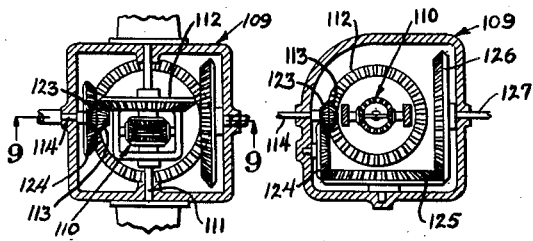
INVENTOR.
J.E. WRIGHT.
BY
ATTORNEY.

Patented June 24, 1930

1,767,032

UNITED STATES PATENT OFFICE

JAMES E. WRIGHT, OF LOS ANGELES, CALIFORNIA

VEHICLE

Application filed January 15, 1927. Serial No. 161,310.

This invention relates to vehicles.

The general object of the invention is to provide an improved vehicle wherein a plurality of supporting wheels are provided at each side of one end of the vehicle and wherein novel means is provided for driving the vehicle by said wheels.

Another object of the invention is to provide a vehicle having four rear wheels mounted for steering purposes and having novel means for driving said wheels.

A further object of the invention is to provide a vehicle wherein the rear of the vehicle is provided with tandem wheels arranged on a frame and wherein the entire frame may swivel and wherein novel means is provided for driving said wheels.

An additional object of the invention is to provide a vehicle wherein both the front and the rear of the vehicle is provided with tandem wheels arranged on a frame and wherein both frames may swivel and wherein means is provided for driving said wheels.

Other objects and advantages of this invention will be apparent from the following description taken in connection with the accompanying drawings wherein:

Fig. 1 is a side elevation of a vehicle embodying the features of my invention.
Fig. 2 is an enlarged fragmentary side elevation of the vehicle, partially in section to more clearly illustrate the invention.

Fig. 3 is a top plan view, partially in section, showing the driving means for the tandem wheels.

Fig. 4 is a section taken on line 4—4 of Fig. 2.

Fig. 5 is a top plan view partly in section of a modified form of driving means.
Fig. 6 is a top plan view of a truck chassis showing another modified form of driving means.

Fig. 7 is a side elevation partly in section of the truck chassis shown in Fig. 6.
Fig. 8 is a horizontal section through one of the differential housings shown in Figs. 6 and 7, showing the differential gearing therein.

Fig. 9 is a section taken on line 9—9 of Fig. 8.

Fig. 10 is a top plan view of a truck chassis showing still another modified form of driving means, and Fig. 11 is a side elevation partly in section of the truck chassis shown in Fig. 10.

This application is in part a division of my co-pending application Serial No. 83,226, filed January 23, 1926.

Referring to the drawings by reference characters I have indicated a motor vehicle embodying the features of my invention, generally at 10. This vehicle comprises a chassis including a frame 11 having a pair of front wheels 12 thereon and having two pairs of rear wheels 14 and 15.

The motor vehicle is shown as of the truck type although this is merely illustrative. The truck is provided with a cab 16, a body 17 which may be of any desired character, and a steering wheel 18. For driving the vehicle I have shown an internal combustion motor 19 and a change speed transmission 20, both of which may be of any suitable type.

The tandem wheels 14 and 15 are mounted on a truck or frame indicated generally at 21. This truck or frame comprises longitudinally extending side members 22 and transverse members or axles 23 and 24. The rear wheels 15 of the truck 21 are shown as mounted for rotary movement about the axis of the transverse axle 24 but do not shift their axis relative to the axis of axle 24. The front wheels 14 of the truck 21 are mounted to turn about the axis of the transverse axle 23 when the truck is moving in a straight line and to shift about vertical axes 25 when the truck or frame 21 is turning.

In order that the truck or frame 21 may be turned I provide a swivel joint 26 (see Fig. 4) on which the frame 11 is supported. This swivel joint 26 includes a transverse bar 27 secured to both side members 22 and provided therebetween with a ball socket 28. A ball 29 secured to a transverse bar 30 is securely held in postion in the socket 28 by means of a retainer plate 31. For supporting the chassis frame 11' I have provided springs 32 secured to the frame 11 and engaging the bar 27 adjacent each of its outer ends.

For driving the wheels 14 and 15 of the truck 21 I have provided a differential 33. The differential 33 is mounted on the bar 27 and consists of a differential gearing 34, the ring gear 35 of which meshes with a driven pinion 36. On transverse shafts 37 of the differential gearing 34 I have provided bevel gears 38 which are in mesh with other bevel gears 39 and 40. I have shown all of the above described gears as contained in a differential housing 41.

The bevel gears 39 are mounted on shafts 42 which are connected to other shafts 43 through the medium of universal joints 44. The shafts 43 are in turn connected to other universal joints 45 through the medium of slip joints 46 and the universal joints 45 are secured to shafts 47 which have secured thereto bevel gears 48 in mesh with other bevel gears 49 secured to the front wheels 14 of the rear truck 21.

The shafts 47 are shown as mounted in bearings 50 which are adapted to turn about the vertical axes 25 so that when the wheels 14 are shifted about the vertical axes 25 the bevel gears 48 and 49 will continue to mesh with one another.

The bevel gears 40 are shown as mounted on shafts 51 which are connected by means of universal joints 52 to other shafts 53 which are in turn connected to other universal joints 54 through the medium of a slip joint 55. The universal joints 54 are secured on shafts 56 which have bevel gears 57 thereon in mesh with other bevel gears 58 secured to the rear wheels 15 of the rear truck 21. The shafts 56 are shown as mounted in bearings 59 of the side members 22 of frame 21.

Brake drums and brake bands of the usual type may be applied to the wheels 14 and 15 as at 60 if so desired.

For driving the pinion gear 36 of the differential I have shown the pinion 36 as mounted on a shaft 61 which is connected to another shaft 62 by means of a universal joint 63. The shaft 62 is connected to another shaft 64 through the medium of a slip joint 65 and a universal joint 66. The shaft 64 is in turn connected to a transmission drive shaft 67 by means of a universal joint 68.

From the foregoing description it will be seen that when the motor 19 is operating and the transmission 20 is put in gear the shaft 67 will rotate and drive the pinion gear 36 through the medium of universal joint 68, shaft 64, universal joint 66, slip joint 65, shaft 62, universal joint 63 and shaft 61.

The pinion gear 36 drives the ring gear 35 which in turn drives the differential gearing 34. The differential gearing 34 drives the transverse shafts 37 which will in turn drive the bevel gears 39 and 40.

The bevel gears 39 are adapted to drive the bevel gears 48 through the medium of shafts 42, universal joints 44, shafts 43, slip joints 46, universal joints 45, and shafts 47. The bevel gears 48 drive the bevel gears 49 which in turn cause the wheels 14 to rotate.

The bevel gears 40 are adapted to drive the bevel gears 57 through the medium of shafts 51, universal joints 52, shafts 53, slip joints 55, universal joints 54 and shafts 56. The bevel gears 57 drive the bevel gears 58 which in turn cause the wheels 15 to rotate.

From the foregoing description it will be apparent that the operation of the shaft 67 will cause constant rotation of the driving wheels 14 and 15 and these wheels will be driven regardless of the angular position of the wheels 14 relative to the axle 23 and regardless of the angular position of the truck 21 relative to the frame 11.

In Fig. 5 I show a slightly modified form of drive wherein the drive shaft 67 drives the shafts 64, 62, and 61 through universal joints 68, 66, and 63 and slip joint 65. The shaft 61 serves to operate a differential 71. This differential is fixed to the side members 22 of the rear truck 21 and drives bevel gears 72. The bevel gears 72 drive shafts 73 which have bevel gears 74 thereon and which mesh with bevel gears 75 and 76. The bevel gears 75 drive universal joints 78 which through the medium of shafts 79 and universal joints 79' drive bevel gears 80 arranged to engage bevel gears 81 fixed on the wheels 14. The shafts 79 which drive the bevel gears 80 are mounted in bearings 82 which are adapted to turn with the gears 80 about the axes 25 so that the wheels 14 will be driven regardless of their angular relation relative to the axle 23 or relative to the truck 21. The shafts 79 are provided with slip joints 83 so that these shafts may be lengthened and shortened as the front wheels 14 turn.

The bevel gears 76 drive shafts 84 which are connected to universal joints 85 which drive bevel gears 86 mounted on shafts 87. The bevel gears 86 drive other bevel gears 88 which are fixed on wheels 15. It will thus be apparent that rotation of the shaft 67 will cause the wheels 14 and 15 to be constantly driven.

In Figs. 6 to 9 inclusive I have shown a modified form of my invention wherein the vehicle chassis 90 is provided with a front swiveling truck 91 and a rear swiveling truck 92. The forward truck 91 swivels in a ball and socket joint 93 and is provided with front wheels 94 and rear wheels 95 which are adapted to rotate about the axes of the transverse axles 96 and 97 and to shift about vertical axes 98 and 99.

The rear truck 92 swivels in a ball and socket joint 100 and is provided with front wheels 101 and rear wheels 102 which are adapted to rotate about the axes of transverse axles 103 and 104 and to shift about vertical axes 105 and 106.

In this modification I have shown the wheels 101 and 102 of the rear truck 92 as adapted to be driven through the medium of driving mechanisms 107 and 108. The driving mechanisms 107 and 108 may be any one of a number of types of driving mechanisms such as are commonly used for front wheel driven vehicles and which include a differential gearing.

The forward differential as indicated at 109 comprises the usual differential gearing 110 (see Figs. 8 and 9) for driving transverse shafts 111 which drive the wheels 101, a ring gear 112 and a drive pinion 113 in mesh with the ring gear. The pinion 113 is mounted on a shaft 114 which is driven from a shaft 115 through the medium of a universal joint 116 and a slip joint 117. The shaft 115 is in turn driven from a change speed transmission 118 which may be of any usual form, by means of a universal joint 119. The change speed transmission 118 is driven from an engine 120 through the medium of a universal joint 121.

For driving the rear differential 122 I provide a bevel gear 123 (see Fig. 9) mounted on the shaft 114 just forward of the pinion 113. The bevel gear 123 drives bevel gear 124 which in turn drives bevel gear 125. The bevel gear 125 drives a bevel gear 126 which in turn drives the rear differential 122 through the medium of shaft 127, universal joint 128, shaft 129, universal joint 130 and shaft 131. The rear differential 122 is similar to the front differential 109 except that it does not contain the bevel gears 123, 124, 125, and 126.

In Figs. 10 and 11 I have shown another modified form of driving wherein the rear wheels 95 of the forward truck 91 and the front wheels 101 of the rear truck are adapted to drive the vehicle. In this form of drive the wheels 95 and the wheels 101 are adapted to be rotated by means of driving mechanisms 135 and 136 having differential gearing contained in a housing 137 and 138. The driving mechanisms 135 and 136 may be of the same front wheel drive type as indicated at 107 and 108 in Figs. 6 and 7. The differential 137 is adapted to be driven from a change speed transmission 139 through the medium of universal joint 140, slip joint 141, shaft 142, and universal joint 143. The rear differential 138 is also adapted to be driven from the transmission 139 through the medium of universal joint 144, slip joint 145, shaft 146, and universal joint 147. The change speed transmission 139 is adapted to be driven from the engine 148 through the medium of a universal joint 149 and a drive shaft 150.

Although I have shown and described my invention as applied to a motor driven highway vehicle it will be understood that the invention is adapted for use with various other forms of vehicles.

From the foregoing description it will be apparent that I have provided a simple and efficient means for driving a vehicle wherein the driving wheels of said vehicle are mounted on a swiveling truck and which are mounted for rotation about transverse axes and shiftable about vertical axes.

What I claim is:

1. In a motor vehicle, a frame, said frame having steerable front wheels thereon, a bogie truck supporting the rear of said frame, said bogie truck having front and rear wheels, said front wheels being steerable, a differential housing supported on said bogie truck, an engine on said frame, a change speed gear device driven by said engine, drive means from said engine to said differential, said drive means including universal joints and a slip joint, a bevel gear at each end of said differential and driven thereby, a pair of propelling bevel gears driven by each of said first gears, a propelling shaft driven by each of said propelling gears, a gear on each of the bogie wheels, a gear on each propelling shaft and engaging a bogie gear, said propelling shafts each including universal joints and a slip joint.

2. In a motor vehicle, a frame, said frame having steerable front wheels thereon, a bogie truck supporting the rear of said frame, said bogie truck having front and rear axles thereon and having steerable front wheels, a pair of side members connecting the front and rear axles, a differential housing supported on said side members, an engine on said frame, a change speed gear device driven by said engine, drive means from said engine to said differential, said drive means including universal joints and a slip joint, a bevel gear at each end of said differential and driven thereby, a pair of propelling bevel gears driven by each of said first gears, a propelling shaft driven by each of said propelling gears, a gear on each of the bogie wheels, a gear on each propelling shaft and engaging a bogie gear, said propelling shafts each including universal joints and a slip joint.

In testimony whereof, I hereunto affix my signature.

JAMES E. WRIGHT.